United States Patent
Birmingham et al.

(10) Patent No.: US 9,598,742 B2
(45) Date of Patent: Mar. 21, 2017

(54) EXHAUST PROCESSING AND HEAT RECOVERY SYSTEM

(75) Inventors: James W. Birmingham, Wellsville, NY (US); Kevin J. O'Boyle, Alma, NY (US)

(73) Assignee: ARVOS Inc., Wellsville, NY (US)

( * ) Notice: Subject to any disclaimer, the term of this patent is extended or adjusted under 35 U.S.C. 154(b) by 798 days.

(21) Appl. No.: 12/724,526

(22) Filed: Mar. 16, 2010

(65) Prior Publication Data
US 2011/0073023 A1    Mar. 31, 2011

Related U.S. Application Data

(60) Provisional application No. 61/245,822, filed on Sep. 25, 2009.

(51) Int. Cl.
*B01D 47/00* (2006.01)
*F23J 11/00* (2006.01)
(Continued)

(52) U.S. Cl.
CPC ............... *C21B 9/14* (2013.01); *C21C 5/38* (2013.01); *F23J 15/006* (2013.01); *F23J 15/02* (2013.01);
(Continued)

(58) Field of Classification Search
CPC ............... B01D 53/50; B01J 8/00; C01B 7/00
(Continued)

(56) References Cited

U.S. PATENT DOCUMENTS 4,474,122 A * 10/1984 Hokari et al. ............. 110/347
4,629,421 A * 12/1986 Kreisberg et al. ........... 432/77
(Continued)

FOREIGN PATENT DOCUMENTS

CN    2544237 Y    4/2003
CN    1563874      1/2005
(Continued)

OTHER PUBLICATIONS

E. M. Ishiyama, W. R. Paterson, D. I. Wilson The Effect of Fouling on Heat Transfer, Pressure Drop and Throughput in Refinery Preheat Trains: Optimisation of Cleaning Schedules,ECI Symposium Series, vol. RP5: Proceedings of 7th International Conference on Heat Exchanger Fouling and Cleaning—Challenges and Opportunities 2007.*

(Continued)

*Primary Examiner* — Jessee Roe
*Assistant Examiner* — Jenny Wu
(74) *Attorney, Agent, or Firm* — MKG LLC

(57) ABSTRACT

A thermally efficiency regenerative air preheater 250 extracts more thermal energy from the flue gas exiting a solid fuel fired furnace 26 by employing an alkaline injection system 276. This mitigates acid fouling by selectively injecting different sized alkaline particles 275 into the air preheater 250. Small particles provide nucleation sites for condensation and neutralization of acid vapors. Large particles are injected to contact and selectively adhere to the heat exchange elements 542 and neutralize liquid acid that condenses there. When the deposit accumulation exceeds a threshold, the apparatus generates and utilizes a higher relative percentage of large particles. Similarly, a larger relative percentage of small particles are used in other cases. Mitigation of the fouling conditions permits the redesign of the air preheater 250 to achieve the transfer of more heat from the flue resulting in a lower flue gas outlet temperature without excessive fouling.

7 Claims, 6 Drawing Sheets

(51) Int. Cl.
*C21B 9/14* (2006.01)
*C21C 5/38* (2006.01)
*F23J 15/00* (2006.01)
*F23J 15/02* (2006.01)
*F23L 15/02* (2006.01)
*F27D 17/00* (2006.01)

(52) U.S. Cl.
CPC ............ *F23L 15/02* (2013.01); *F27D 17/004* (2013.01); *F27D 17/008* (2013.01); *C21B 2100/06* (2013.01); *C21C 2100/06* (2013.01); *F23J 2217/102* (2013.01); *F23J 2219/40* (2013.01); *Y02P 10/122* (2015.11); *Y02P 10/132* (2015.11)

(58) Field of Classification Search
USPC ..... 423/244.01, 244.05, 244.07; 272/244.01, 272/244.05, 244.07
See application file for complete search history.

(56) References Cited

U.S. PATENT DOCUMENTS

| | | | |
|---|---|---|---|
| 6,089,023 | A | 7/2000 | Anderson et al. |
| 6,233,926 | B1* | 5/2001 | Bailey et al. ................... 60/295 |
| 6,352,653 | B1* | 3/2002 | Hirano ................ B01D 53/508 252/189 |
| 6,647,929 | B1* | 11/2003 | Counterman ................. 122/1 A |
| 7,887,694 | B2* | 2/2011 | Constantz et al. ............ 423/220 |
| 2002/0168302 | A1* | 11/2002 | Pahlman et al. .............. 422/171 |
| 2005/0053537 | A1* | 3/2005 | McCollor et al. ....... 423/244.05 |
| 2005/0194120 | A1* | 9/2005 | Lomax et al. ................ 165/100 |

FOREIGN PATENT DOCUMENTS

| | | |
|---|---|---|
| CN | 2828699 Y | 10/2006 |
| CN | 201314555 Y | 9/2009 |
| GB | 2107601 | 5/1983 |
| JP | 62244424 | 10/1987 |
| JP | 63-201417 | 8/1988 |
| JP | 2000-317260 | 11/2000 |
| JP | 2001-000833 | 1/2001 |
| JP | 2002-298719 | 10/2002 |
| JP | 2005029816 | 2/2005 |
| JP | 2007253130 | 10/2007 |

OTHER PUBLICATIONS

PCT International Search Report and the Written Opinion of the International Searching Authority, dated Nov. 22, 2010—(PCT/US2010/048844).

First Office Action of the State Intellectual Property Office of China dated Mar. 29, 2013 for Application 2010800535887.

Notification of Reasons for Refusal of the Japanese Patent Office dispatched Aug. 20, 2013 for JP application 2012-530931.

Andracsek, Robynn et al., "Particulate Emissions—Comustion Source Emissions Dependent on Test Method", found at http://www.epa.gov/ttnchie1/conference/ei14/session9/andracsek.pdf and http://www.epa.gov/ttnchie1/conference/ei14/ (Apr. 2005).

* cited by examiner

EXHAUST PROCESSING AND HEAT RECOVERY SYSTEM

CROSS REFERENCE TO RELATED APPLICATIONS

This application claims priority from U.S. Application Ser. No. 61/245,822 "Exhaust Process and Heat Recovery System" by James W. Birmingham and Kevin J. O'Boyle filed Sep. 25, 2009 and incorporates the material of the priority application to the extent that it does not contradict the present application.

BACKGROUND

1. Field of the Invention

This invention relates generally to an exhaust processing and heat recovery (EPHR) system and method for use with fossil fuel fired furnaces. More particularly, the present invention relates to an EPHR system in which alkaline particles are introduced into a flue gas stream to allow additional heat extraction and reduce fouling of air preheater equipment.

2. Discussion of Related Prior Art

Many power generation systems are powered by steam that is generated via furnaces fired by fossil fuels, such as, for example, coal or oil. A typical power generation system is generally depicted in the diagram shown in FIG. 1A.

FIG. 1A shows a power generation system 10 that includes a steam generation system 25 and an exhaust processing and heat recovery system (EPHRS) 15 and an exhaust stack 90. The steam generation system 25 includes a furnace 26. The EPHRS 15 may include a regenerative air preheater 50, a particulate removal system 70 and a scrubber system 80. A forced draft (FD) fan 60 is provided to introduce air into the cold side of the air preheater 50 via inlet 51. The particulate removal system 70 may include, for example, an electrostatic precipitator (ESP), and/or a fabric filter system (Bag House), or the like. Scrubber system 80 may include, for example, a wet or dry flue gas desulphurization (WFGD/DFGD) systems.

The regenerative air preheater 50 helps increase the thermal efficiency of furnace 26, thereby reducing its operating costs and emissions of greenhouse gases. An air preheater 50 is a device designed to heat air before it is introduced to another process such as, for example, the combustion chamber of a furnace 26. There are different types of regenerative air preheaters, including those that include moving or rotating heat exchange elements, such as, for example, the Ljungstrom® air preheater. Other regenerative air preheaters utilize fixed heat exchange elements and/or internally rotating hoods or ductwork that is fixed to rigid air and/or gas ducts.

FIG. 1B and FIG. 1C are diagrams generally depicting a conventional rotary regenerative preheater 50. The typical air preheater 50 has a rotor 512 rotatably mounted in a housing 524. The rotor 512 is formed of diaphragms or partitions 516 extending radially from a rotor post 518 to the outer periphery of the rotor 512.

The partitions 516 define compartments 520 there between. These partitions 516 contain heat exchange element basket assemblies 522. Each basket assembly 522 includes one or more specially formed sheets of heat transfer surfaces that are also referred to as heat exchange elements 542. The surface area of the heat exchange elements 542 is significant, typically on the order of several thousand square feet.

In a typical rotary regenerative air preheater 50, the flue gas stream, FG1 and the combustion air stream, A1, enter the rotor 512 from opposite ends/sides of the air preheater 50 and pass in opposite directions over heat exchange elements 542 that are housed within the basket assemblies 522. Consequently, the cold air inlet 51 and the cooled flue gas outlet 54 are at one end of the air preheater 50 (generally referred to as the cold end 544) and the hot flue gas inlet 53 and the heated air outlet 52 are at the opposite end of the air preheater 50 (generally referred to as the hot end 546). Sector plates 536 extend across the housing 524 adjacent the upper and lower faces of the rotor 512. The sector plates 536 divide the air preheater 50 into an air sector 538 and a flue gas sector 540.

The arrows shown in FIG. 1B and FIG. 1C indicate the direction of the flue gas stream FG1/FG2 and the air stream A1/A2 through the rotor 512. The flue gas stream FG1 entering through the flue gas inlet 53 transfers heat to the heat exchange elements 542 in the basket assemblies 522 mounted in the compartments 520 positioned in the flue gas sector 540. The heated basket assemblies 522 are then rotated to the air sector 538 of the air preheater 50. The stored heat of the basket assembly 522 is then transferred to the air stream A1 entering through the air inlet 51. The cold flue gas FG2 stream exits the preheater 50 through the flue gas outlet 54 and the heated air stream A2 exits the preheater 50 through the air outlet 52.

Referring back to FIG. 1A, air preheater 50 heats the air introduced via FD fan 60. Flue gas (FG1) emitted from the combustion chamber of the furnace 26 is received by the air preheater via inlet 53. Heat is recovered from the flue gas (FG1) and is transferred to input air (A1). Heated air (A2) is fed into the combustion chamber of the furnace 26 to increase the thermal efficiency of the furnace 26.

During the combustion process in furnace 26, sulfur in the fuel used to fire the furnace 26 is oxidized to sulfur dioxide ($SO_2$). After the combustion process, some amount of $SO_2$ is further oxidized to sulfur trioxide ($SO_3$), with typical amounts on the order of 1% to 2% going to $SO_3$. The $SO_2$ and $SO_3$ will be passed from the combustion chamber of the furnace 26 and into the exhaust flue as part of the flue gas FG1 that is then emitted from the steam generating system 25 and received by the inlet 53 of air preheater 50. The presence of iron oxide, vanadium and other metals at the proper temperature range allows this oxidation to take place. Selective catalytic reduction (SCR) is also widely known to oxidize a portion of the $SO_2$ in the flue gas FG1 to $SO_3$.

As heat is being recovered/extracted by the air preheater from the flue gas FG1, the temperature of the flue gas FG1 is reduced. It is desirable to remove the maximum amount of heat from the flue gas and transfer it to the heated air going to the furnace or the fuel pulverizer mills to optimize the thermal efficiency of the power plant. Additional heat extraction allows for the design/use of particulate collection equipment, gaseous cleanup equipment, ducting and stacks downstream of the flue gas outlet that are rated for lower temperature ranges and reduced volumetric flow rates. The lower temperature rating and lower flow rate mean that tremendous cost savings can be realized by not having to provide equipment capable of withstanding higher temperatures and higher flow rates. However, the lower flue gas temperature range may result in excessive condensation of sulfur trioxide ($SO_3$) or sulfuric acid vapor ($H_2SO_4$) that may be present in the flue gas. As a result, sulfuric acid may accumulate on surfaces of the heat exchange elements 522 of the air preheater 50. Fly ash in the flue gas stream can be collected by the condensed acid that is present on the heat transfer surfaces. This acid causes fly ash to stick more tightly to surfaces. This "fouling" process impedes the air and flue gas flow thru the air preheater, resulting in increased pressure drop through the air preheater plus lower heat transfer effectiveness.

After a period of time, accumulations of acid and flyash on surfaces of the air preheater 50 grow so large that they must be removed in order to maintain the thermal performance and an acceptable pressure drop the air preheater. This is typically accomplished by periodically (for example, 3 times daily) "sootblowing" the heat transfer surface with compressed air or steam to remove the deposits that have accumulated on the heat transfer surface while the air preheater is operating. In addition, if required, washing the air preheater with water may be conducted during an outage of the steam generation system 25 when the furnace 26 is shut down and maintenance operations are performed.

A potential benefit to reducing the flue gas outlet temperature is that the particulate removal system 70 and scrubbing equipment 80 may be designed for a lower operating temperature. The lower temperature flue gas also has a lower volumetric flow rate. The reduction in flue gas temperature, volume and acidity reduce operating and capital costs that are associated with equipment designed for the higher volumetric flow rates, higher operating temperatures, or higher $SO_3/H_2SO_4$ concentrations in the flue gas. These conditions would exist if the acid were not condensed and/or neutralized to prevent excessive fouling of the heat transfer surfaces. Once the flue gas exhaust has passed through particulate removal and scrubbing operations, it is then ready for introduction to the exhaust stack 90 for elevation and dispersion over a wide geographic area.

Extraction of heat from flue gases is beneficial and is used for performing various operations in a typical plant. However, in existing coal and/or oil fired steam generation systems, it is costly to remove additional heat from the exhaust gas stream. Excessive reduction of the flue gas temperature without consideration for the additional condensation of $H_2SO_4$ vapors in the flue gas, will result in excessive fouling of the heat transfer surfaces in the air preheater. Thus, a need exists in the industry to address the aforementioned deficiencies and inadequacies.

SUMMARY OF THE INVENTION

The invention may be embodied as a method of extracting heat from a flue gas stream FG1 having acidic material and flue gas particulates using an air preheater 250 having a flue gas inlet 253, flue gas outlet 254 and a plurality of heat exchange surfaces 542, comprising the steps of:

receiving a flue gas stream FG1 into the flue gas inlet 253 of the air preheater 250;

calculating a mass flow rate of acid material passing in the flue gases FG1;

calculating a mass flow rate of alkaline particles 275 to be injected into the flue gas stream FG1 to neutralize the acidic material;

injecting alkaline particles 275 with a distribution of particles sizes at the calculated mass rate into the flue gas stream upstream of the air preheater 250;

calculating a degree of accumulation of particulates;

based upon the degree of accumulation of particulates, adjusting at least one of a size distribution of the alkaline particles 275 being injected into the flue gases, and the mass flow rate at which the alkaline particles 275 are injected into the flue gases;

thereby reducing accumulation of flue gas particulates on the heat exchange elements 542, plus reducing fouling within the air preheater, and thereby increasing the thermal efficiency of the air preheater 250.

The degree of fouling may be calculated by measuring a pressure drop across the air preheater 250 from the flue gas inlet 253 to the flue gas outlet 254 and comparing the measured pressure drop to at least one predetermined threshold.

When using a rotary air preheater having a rotor that is rotated by an motor powered by electric current I of varying voltage V, the degree of fouling may be calculated by measuring the voltage V and electric current I, and comparing the measured current at the measured voltage to a predetermined current for the same voltage to determine a current difference. The current I difference is compared to prestored conversion information to determine a degree of fouling.

The present invention may also be embodied as a method of reducing fouling of an air preheater 250 used in recovering heat from a furnace 26 that creates flue gases with acidic materials and flue gas particulates, comprising the steps of:

providing an air preheater 250 coupled to said furnace 26 to receive said flue gases FG1 at a flue gas inlet 253, pass them over a plurality of heat exchange plates 542 and exhaust said flue gases out of a flue gas outlet 543;

sensing or calculating a mass flow rate of acidic material in said flue gases;

calculating a mass flow rate of alkaline particles required to adequately neutralize the acidic materials in the flue gases;

injecting the alkaline particles 275 at the calculated mass flow rate into flue gases entering the air preheater 250;

sensing a pressure drop from the flue gas inlet 253 to the flue gas outlet 254 of the air preheater 250;

increasing the mass rate of alkaline particles 275 injected into the flue gases when the sensed pressure drop is greater than a predetermined threshold, and decreasing the mass rate of alkaline particles 275 injected into the flue gases when the sensed pressure drop is lower than a predetermined threshold; and repeating the steps above during operation of the furnace 26 to reduce fouling of the air preheater 250 allowing it to more efficiently extract heat. Additional heat, beyond the levels that are achieved with current air preheater design technologies, can be extracted from the flue gas as a result of reducing the gas outlet temperature of the heat exchanger without excessive fouling or corrosion activities within the air preheater that would exist if the $SO_3/H_2SO_4$ were not condensed and neutralized by the alkaline material injected into the flue gas stream upstream of the air preheater.

The present invention may also be embodied as an exhaust processing and heat recovery (EPHR) system 215 for more efficiently recovering heat from a furnace 26 producing heated flue gases FG1 having acid vapors and entrained flue gas particulates comprising:

an air preheater 250 coupled to said furnace 26, the air preheater 250 having:

an flue gas inlet 253 adapted to receive said flue gases FG1, a plurality of heat exchange plates 522 for extracting heat from the flue gases; and a flue gas outlet 254 for exhausting the flue gas stream FG2 after it has passed over the heat exchange plates 522;

flue gas sensors 310 to monitor physical and chemical conditions within the flue gases;

pressure drop sensors 301, 303 adapted to measure the drop in pressure from the air preheater inlet 253 to the air preheater outlet 254;

an alkaline injection system 276 responsive to control signals from another device, for introducing alkaline particles 275 into a flue gas stream FG1 upstream of an air preheater 250 when actuated; and a PLC controller 305 adapted to calculate a mass flow rate of alkaline particles 275 based upon the sensed flue gas conditions; and adapted to control the alkaline injection system 276 to inject the calculated mass flow rate of alkaline particles 275 to neutralize the acidic materials in the flue gases.

The present invention may also be embodied as an efficient, low cost furnace system having:

a. a fossil fuel furnace that produces heated flue gases;

b. an air preheater coupled to the furnace, adapted to receive the heated flue gases, neutralize acids in the heated flue gases, extract heated combustion air for the furnace, extract additional heated air to be used elsewhere in the system, reduce flue gas temperature below a flue gas acid dew point, reduce the volume of flue gases exiting the preheater; and c. flue gas processing equipment coupled to, and downsteam of the air preheater that are more compact and less costly than those used on systems that do not have air preheaters that neutralize flue gas acids.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The present invention may be better understood and its numerous objects and advantages will become apparent to those skilled in the art by reference to the accompanying drawings in which.

DESCRIPTION OF THE INVENTION

The purpose of this invention is to provide a means to extract more heat from the flue gas as it passes through the gas side of the regenerative air heater without the heat transfer surfaces of the equipment downstream of the regenerative air preheater becoming excessively fouled or corroded.

The present invention is directed to control the amount of acid that is condensed and accumulated on heat transfer elements of an air preheater and to thereby improve the effectiveness of the air preheater in extracting heat from a flue gas stream FG1 from the combustion chamber of, for example, a furnace. A further aspect of the invention is directed to controlling the "wetness" of the deposit on the heat transfer surfaces so that the deposit can be maintained in a condition that allows it (the deposit) to be easily removed while the air preheater is in operation. A further aspect of the proposed invention is directed to an air preheater that is configured to allow for the distribution of additional heat extracted from the flue gas stream FG1 due to the increased efficiency of the air preheater in extracting heat from the flue gas stream.

Reduction of the $SO_3$ concentration entering the air heater, plus an additional means to extract heat from the flue gas as it passes through the air preheater will have several benefits: (1) the volumetric flue gas flow leaving the air heater will be lower, (2) the preheat temperatures of the air side flows (generally called primary and secondary air) can be increased, and (3) Additional energy in the form of preheated air can be made available for use elsewhere in the plant. Potential uses of this additional energy are: preheating boiler feedwater, drying pulverized coal, conveying the pulverized coal to the burners, supplying energy to post-combustion $CO_2$ capture systems, reheating stack gas to reduce visible water vapor plume or for other uses where heat is needed within a power plant.

Figure 2A:
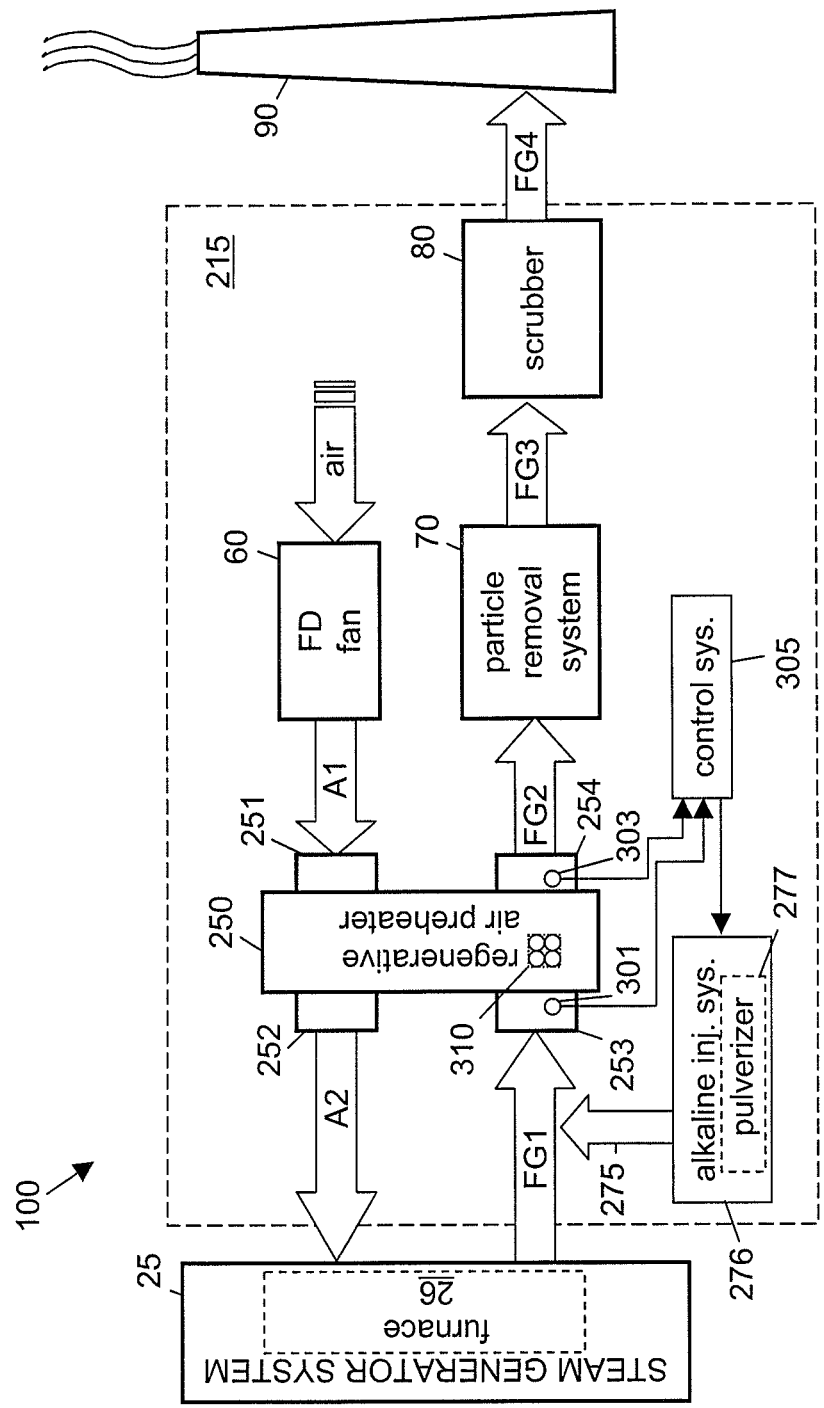
FIG. 2A is a diagram generally depicting one embodiment of an exhaust processing and heat recovery system in accordance with the invention.
Figure 2B:
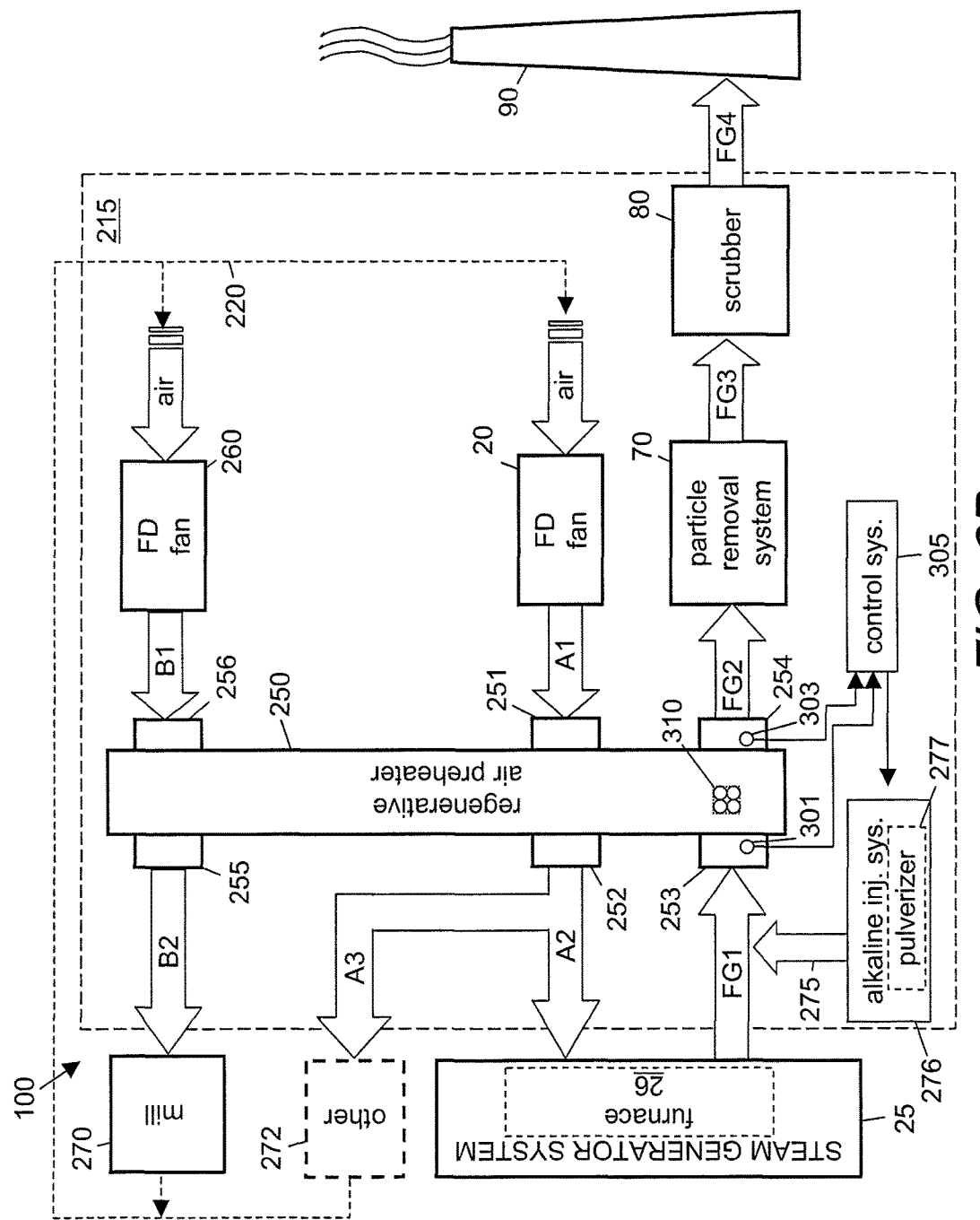
FIG. 2B is a diagram generally depicting a further embodiment of an exhaust processing and heat recovery system in accordance with the invention.

FIG. 2A and FIG. 2B are diagrams generally depicting embodiments of an exhaust processing and heat recovery system 215 in accordance with the proposed invention. FIG. 2A is a diagram depicting one embodiment of an EPRS 215 that is includes an alkaline injection system 276 to interactively introduce a sorbent of alkaline particles 275 into the flue gas stream FG1 prior to FG1 being received by the air preheater 250 via inlet 253. Alkaline injection system 276 has the ability to selectively introduce various size distributions of alkaline particles 275 in the sorbent.

In this embodiment, the EPRS 215 includes a regenerative air preheater 250, a particulate removal system 70 and a scrubber system 80. An FD fan 60 is provided to introduce an air stream A1 into the cold side of the air preheater 250 via inlet 251. The particulate removal system 70 may include, for example, an electrostatic precipitator (ESP), and/or a fabric filter system (bag house), or the like. Scrubber system 80 may include, for example, a wet or dry flue gas desulphurization (WFGD/DFGD) system.

Figure 1A:
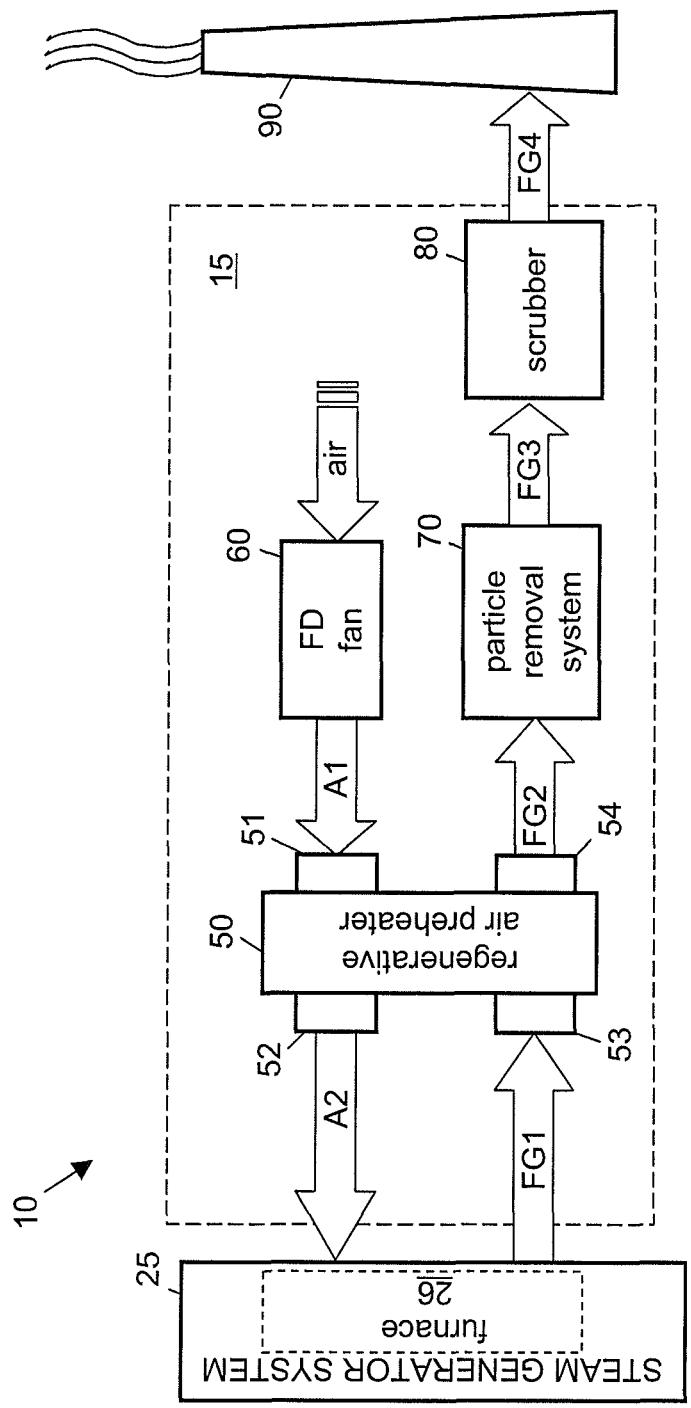
FIG. 1A is a diagram depicting a typical steam generation system and associated exhaust processing equipment.
Figure 1B:
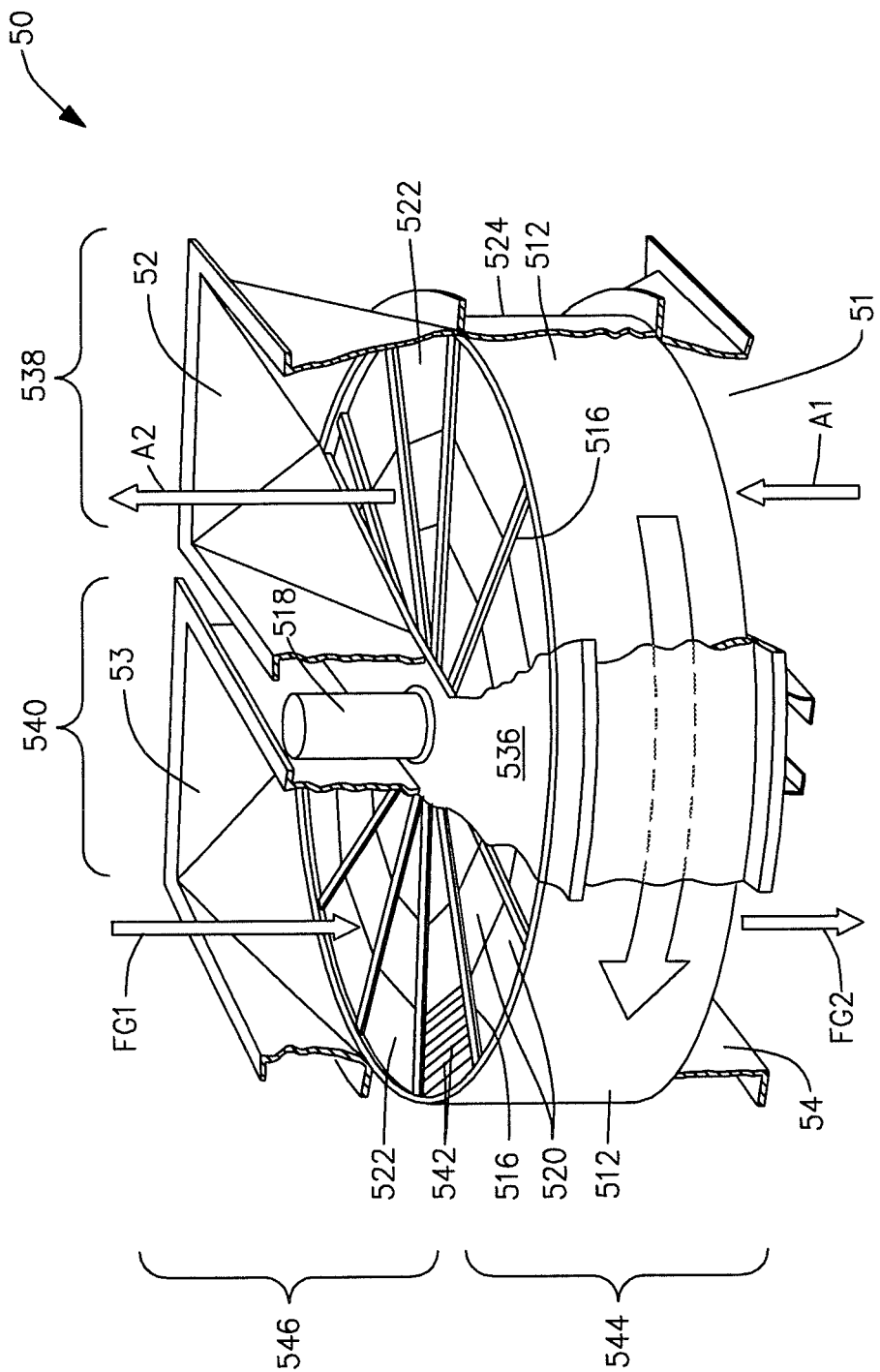
FIG. 1B is a diagram depicting a perspective view, partially broken away, of a conventional rotary regenerative air preheater.
Figure 1C:
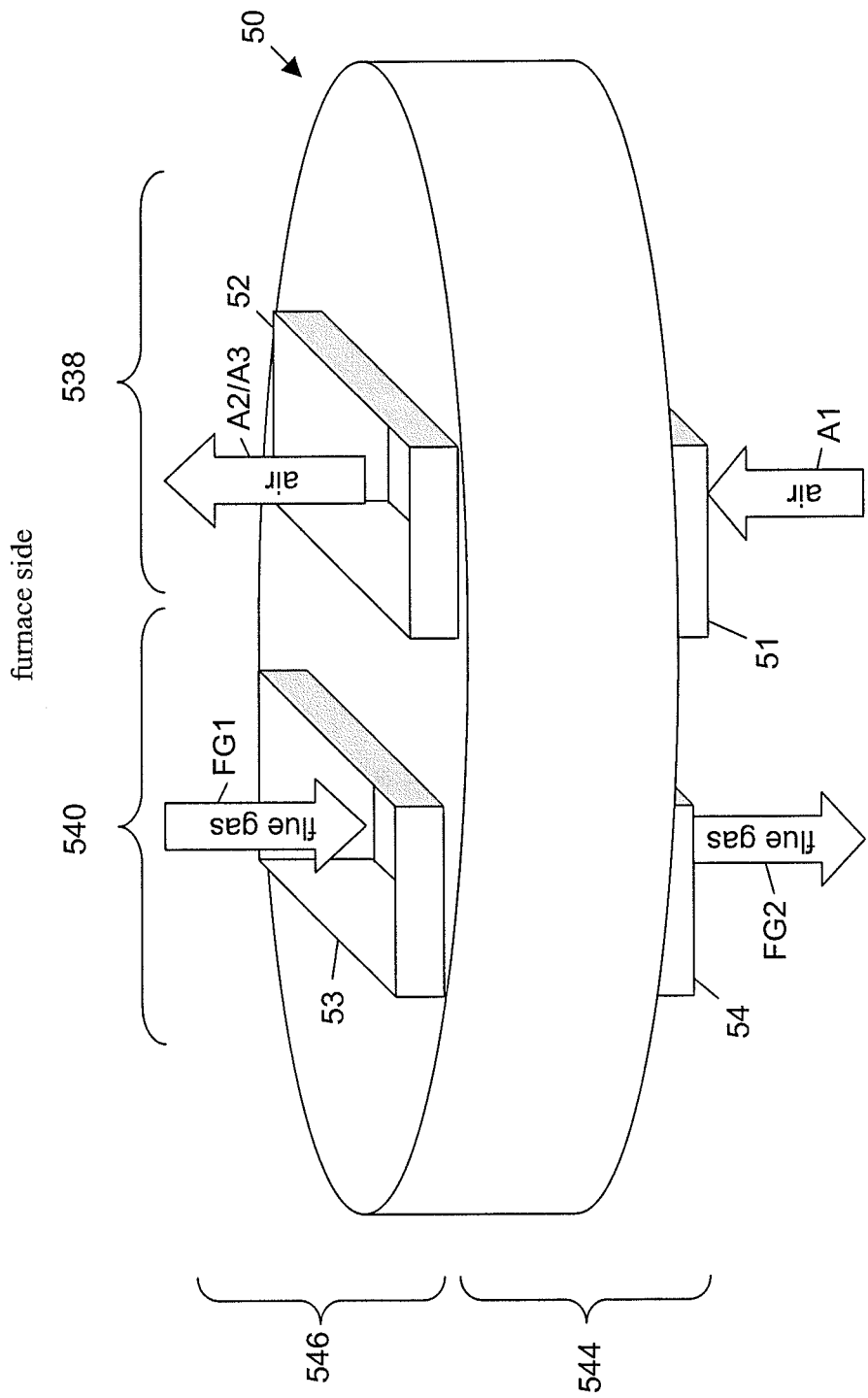
FIG. 1C is a schematic diagram depicting a further perspective view of the conventional rotary regenerative air preheater of FIG. 1B.

During operation of the EPRS 215, sulfur trioxide ($SO_3$) and water vapor ($H2O$) in the flue gas FG1 can combine to form an acid vapor in the operating temperature range of the flue gas upstream of the air preheater 250. Once the flue gas containing this acid vapor reaches the air preheater 250 it will come in contact with, condense and accumulate on, various surfaces in the air preheater 250, including heat transfer elements (542 of FIG. 1B) when it is cooled below its acid dew point temperature. This accumulation of condensed acid will "foul" the air preheater operation by collecting and retaining flyash particles on the surface of the heat transfer surface, thus impeding the flow of flue gas FG1 through the air preheater 250. This results in an excessive pressure drop through the air preheater and overall drop in effective transfer of heat from the flue gas stream FG1 to the input air stream A1.

The acid vapor and condensed acid may be referred to collectively as 'acidic material'.

One embodiment of the present invention employs flue gas sensors 310 that monitor physical and chemical parameters of the flue gas. Depending upon their use they may be located at the inlet or outlet, or other location within the air preheater 250.

A programmable logic controller ("PLC controller") 305 reads the sensor information and determines a proper mass flow rate to neutralize the acidic material in the flue gases. This mass flow rate may also be determined by calculation from air and fuel firing conditions that are transmitted from the furnace by various methods of data communication in use in fossil fuel fired furnaces. It may also control an alkaline injection system 276 causing it to inject the calculated mass flow rate of correctly sized alkaline material into the flue gases upstream of the flue gas inlet 253.

Alkaline particles 275, such as powdered limestone or other alkaline materials are introduced as a sorbent into the flue gas stream FG1 upstream of the air preheater 51 (i.e. before the flue gas stream FG1 reaches the air preheater 50). These particles serve as condensation sites within the flue gas stream FG1 for the acid vapors, and then function to neutralize the condensed acid. Both the condensation and neutralization of the acid occurs inside the air preheater when the flue gas is cooled to a temperature that will initiate condensation of the acid vapor. Introducing an adequate mass quantity, for example, 1% to 25% mass ratio of alkaline particles to flyash concentration into the flue gas stream FG1 as it passes through the air preheater 250 causes most of the acid to neutralize. However, introducing alkaline material into the flue gas stream strictly on a stoichiometry basis does not result in the most effective control of fouling caused by the build-up of acid within the air preheater 250. In order to more effectively control the creation and build up of acid within the air preheater, it is proposed that the alkaline particles that are introduced into the flue gas stream FG1 have a varying range of sizes (diameters).

By measuring the temperature gradient of the flue gas as it passes thru the heat transfer surfaces within the air preheater, and controlling the mass quantity, and size distribution of the alkaline particles that are introduced into the flue gas stream FG1, it is possible to control the extent to which acid condenses and remains on the heat transfer surface and in the flue gas as the flue gas passes through the air preheater 250.

The size of fly ash particles, produced from the typical combustion of coal, varies from below 0.01 microns to over 100 microns. The smaller diameter particles of fly ash or other particulate material in the flue gas stream FG1, generally less than 5 microns in diameter, tend to provide a good nucleus for condensation and potential neutralization of $H_2SO_4$ vapor that may exist in the flue gas stream FG1.

If the condensation results in a deposit on the heat transfer surface that cannot be removed by cleaning methods employed while the air preheater is in operation, the deposit will accumulate to the point where the normal operation of the air preheater cannot be maintained. However, when the condensation process is combined with the neutralization process that can occur when an adequate mass quantity of alkaline materials of the proper particle size distribution are injected into the flue gas stream, successful operation of the air heater can be maintained. The neutralization process will result in the reduction in the amount of acid that remains on the heat transfer surface and embedded in the particulate deposits within the air preheater.

An important factor in the effectiveness of the control of fouling within the air preheater is the location where the flue gas particulates and alkaline particles in the flue gas contact the various heat transfer surfaces of the air preheater exchange elements (542 of FIG. 1B), as well as the size of these particles. Smaller particles have a greater tendency to follow the flue gas flow and a lesser tendency to strike the surface of heat exchange elements. Large particles, generally greater than 15 microns, have more momentum and a greater tendency to impact the surface of the heat exchange elements. Large particles also have a greater tendency to fall off (without accumulating thereon) the surfaces of the heat exchange elements if there is little or no acid present on the surface of the particle or on the surface of the heat exchange elements. The large particles can also act to "scrub", or erode, small particles from the air preheater surfaces, such as the heat transfer elements if the small particles are not strongly bonded to the surface.

Injection of alkaline particles downstream of the air preheater is typically done to control $SO_3$ plume emissions and to enhance mercury removal by the bag house or precipitator. However, this does not impact the fouling of the air preheater.

In the present invention, the alkaline particles are injected into the ductwork upstream of the gas inlet to the air preheater. They must be distributed via the injection system to insure that there is an adequate supply of the alkaline material is evenly dispersed throughout the cross-section of the ductwork to insure the condensation and neutralization processes can occur once the flue gas stream enters the air preheater and is cooled to its dew point temperature or comes in contact with the heat transfer surfaces within the air heater that are below the acid dew point temperature.

When flue gases containing sulfur trioxide and water vapor are at a temperature that is below the acid dew point, sulfuric acid condensates to a liquid. Condensation will occur on surfaces within the air preheater having temperatures that are below the local dew point temperature, and upon further cooling, it may also occur within the gas stream itself.

When the gas stream reaches a supersaturated state, sulfuric acid may condense by self-nucleation in the absence of entrained particulates. This generally occurs when the flue gas temperature is below the local acid dew point. If the gas stream contains entrained particles, these particles act as nucleation sites, and condensation occurs at temperatures closer to the local dew point.

In general, and when present, the small particles are the first to produce condensate when it appears within the gas stream. This is due to the fact that small particles have higher surface area to volume ratios, and this allows them to more closely follow flue gas temperature during cooling. Large particles have lower ratios that cause them to retain more heat, and upon cooling, they remain warmer than the surrounding flue gas. Therefore, in order to preferentially condense and chemically neutralize acid on an injected alkaline particle—as opposed to condensing on native flyash with little neutralizing capacity due to its composition, the size of the particle should be small compared to the majority of the native fly ash particles.

As previously stated, acid condensation begins on heat transfer surfaces with temperatures at or below the acid dew point. In order to adequately consume this acid to a level that results in a deposit on the heat transfer surfaces that can be removed by sootblowing or water washing, the alkaline particles must be deposited on the acid-wetted heat transfer surfaces at a suitable rate that adequately neutralizes the acid in the flyash. Thus, at this location the role of the alkaline particle has little in common with that of an optimum nucleation site, and its size requirements are different.

The physical momentum of the gas-entrained particles is the means by which the majority of the particles reach the surfaces of the heat transfer elements within the air preheater. Assuming that all particles have the same density, and travel through the air preheater with a velocity equal to that of the surrounding flue gas, small particles have a lesser momentum due to their lower mass. Therefore, given equal quantities entrained in flue gas, small particles will have a lesser deposition rate on the heat transfer surfaces. If greater deposition rates are required to consume acid condensed on the heat transfer surface, a large alkaline particle size may be preferable compared to increasing the quantity of small alkaline particles in the gas stream.

Optimum injection rates for alkaline particles may be achieved when the size distribution of the particles accounts for the two different purposes presented above. This size distribution is likely to be bimodal including ranges of both small and large particle sizes.

It is possible to further locate where within the air preheater acid will condense.

It is also possible to calculate and alter the alkaline particle distribution to 'target' locations with the air preheater to deposit the alkaline particles.

As flue gas passes through the air preheater, it cools. This causes a temperature gradient to be created. Knowing the inlet temperature and the outlet temperature, one can estimate the gradient across the air preheater.

As flue gas passes through the air preheater, it loses flow velocity. Again, this velocity gradient may be estimated knowing the inlet velocity and the outlet velocity.

The alkaline particles are subject to the force of the flowing flue gases. The flue gas force exerted on a particle depends upon the flue gas velocity, the particle's wind resistance and the weight of the particle.

The particles also have momentum due to their motion. The momentum of the particle is based upon the particle's velocity and mass.

When the flue gas force is not great enough to change the momentum of the particle directing it away from a surface, the particle impacts the surface. If the surface has condensed acid, the particle is very likely to stick to the surface. If the particle is an alkaline particle, it neutralizes some of the condensed acid.

Smaller particles have high surface area/mass ratio, and therefore a large wind resistance per unit mass. Larger particles have a smaller surface area to mass ratio, and have less wind resistance per unit mass and are less affected by the flue gas force.

For the same velocity, particles with greater mass have a larger momentum.

Assuming the same density for all particles, larger particles have larger mass.

As particles travel through the air preheater, they lose velocity. If the flue gas forces become weak enough (due to the lower velocity) so that they cannot alter the momentum of the particle away from a surface, the particles impact surfaces within the air preheater.

The distance that the particles travel through the air preheater before impacting a surface is dependent upon the particle size. Very small particles may be carried with the flue gas out of the preheater without impacting a surface at all. Therefore, the particle size is indicative of the location that a particle will be deposited and particle size distribution indicates how many particles will be deposited at various locations within the air preheater. If the particle size distribution is continuous in a proper size range, then the particles will blanket a contiguous region within the air preheater. Therefore, if one determines the location where the acids will condense, the particle size distribution may be chosen to deposit the majority of particles in the locations where acid is expected to condense.

The mass quantity of alkaline material, as well as the particle size distribution of the alkaline material, are factors in controlling the degree of fouling within the air preheater. The overall quantity of alkaline material introduced into the flue gas stream FG1 must be adequate, however the particle size distribution must also be provided so that the alkaline particles actually contact the heat transfer surface locations within the air preheater at points where the acid condensation/accumulation tends to occur. As the acid in the flue gas stream FG1 is neutralized and consumed, the accumulations become less sticky and can be more easily removed with soot blowing and/or water washing technologies. Without condensed acid present in the flue gas stream FG1, or on the heat transfer surface, particles, such as fly ash, do not form a deposit with strong adhesion properties on the surface of the heat exchange elements and thus, will not accumulate on the heat exchange elements to the thickness that will impede the flow of flue gas FG1 thru the air preheater. The less that the flow of flue gas FG1 thru the air preheater is impeded, the more heat the air preheater can extract from the flue gas stream FG1.

In one embodiment of the proposed invention, alkaline particles are introduced into the flue gas stream FG1 have a bi-modal particle size distribution. These alkaline particles include "small" particles and "large" particles. The small particles are preferably sized to be within a range of 1 micron-15 microns in diameter, while the large particles are sized to be within a range of 15 microns to 150 microns. In general, all particles introduced into the flue gas stream FG1 will be within a size range of 1 microns to 250 microns in diameter. The mass quantity of alkaline material required to be injected into FG1 is a function of the $SO_3/H_2SO_4$ concentration in FG1, the flue gas flow rate, the mass quantity of flyash in FG1, and the chemical composition of the flyash in FG1. In general, the higher the concentration of $SO_3/H_2SO_4$ in FG1, the higher the mass quantity of alkaline material that must be injected. Flyash with a higher alkaline content will generally require less injection of alkaline material into FG1 because the native alkalinity of the fly ash will aid the neutralization and consumption of $H_2SO_4$ in the flue gas stream. The alkaline particles are preferably introduced into the flue gas stream FG1 before the flue gas stream FG1 reaches the air preheater. Flue gas sensors 310 may include a flue gas flow rate sensor, a particulate concentration sensor, and/or a sampling sensor, for measuring the alkalinity of the flue gas particulates.

These particles may be introduced into the flue gas stream FG1 via, for example, as a dry material or as a liquid slurry that is injected via a distribution system, such as, for example, spray nozzles or injection devices (injectors) for introducing the particles into the flue gas stream FG1. The distribution system may be installed in the gas inlet ductwork leading to the air preheater. The distribution system is preferably configured to result in a uniform and adequate distribution of alkaline material across the flue gas stream FG1 as it enters the air preheater. Alkaline distribution system 276 may employ compressed air to be utilized as a transport medium for the dry injection, or water supplied via a pump(s) could be used as the transport medium for the wet injection. Dry injection is the preferred method of introducing the alkaline particles into FG1, but a wet system designed to provide adequate dwell time in FG1 for the evaporation of the water and drying of the alkaline particles is also a suitable method.

The mass quantity per unit time of alkaline sorbent injected can be controlled by monitoring several operating parameters associated with the air preheater and plant operation. This information can be collected from the overall plant control system, or obtained by the installation of specific data collection instrumentation. This input is provided to a PLC controller 305 controlling an alkaline injection system 276. The quantity of sorbent to be injected will be a function of the mass flow rate and temperature of the flue gas entering the air heater, plus the concentration of the $SO_3$ and water vapor in the flue gas entering the air heater. The content of $SO_3$ in the flue gas entering the air preheater could be calculated from the sulfur content of the fuel, air/fuel ratio in the furnace, plus the temperature of the flue gas leaving the furnace and catalyst system installed upstream of the air preheater. The content of $SO_3$ in the flue gas can be calculated from the combustion efficiency characteristics of the fuel firing system. Most of these parameters may be read from an industrial system controller (not shown) that is used to operate the furnace 26, directly measured in the flue gas stream by flue gas sensors 310, or measured by means of wet chemistry or other suitable instrumentation that is commercially available. As a general rule, the lower the temperature of the flue gas leaving the air preheater, the lower the temperature of the heat transfer surfaces within the air preheater. Therefore, the amount of acid condensed and accumulated on the heat transfer surfaces will increase as the gas outlet temperature is decreased. As a result, lower gas outlet temperature or lower heat transfer surface temperature operation will require a higher rate of sorbent mass flow injection to prevent excessive fouling of the air preheater with a deposit that is too "wet" to be removed.

An added benefit of the large alkaline particles may be their natural tendency to aid in the "scrubbing" of deposits present on the heat transfer surfaces. Once again, the particle size that produces the scrubbing affect will have little in common with the size of an optimum nucleation site, and may not have the same size as a particle destined to consume acid condensed on the heat transfer surface.

The above parameters are measured and fed as inputs to the PLC controller 305. The PLC controller 305 can be used to control the particle size distribution and/or the amount of alkaline sorbent injected into the air preheater over the entire operating range. For example, as the mass flow of flue gas entering the air preheater 250 is reduced, the PLC controller 305 will recalculate the quantity of sorbent required as a result of this change while also factoring in the current status of the other parameters being measured to complete the calculation of the required quantity of sorbent mass flow and its associated particle size distribution, and send a signal to the alkaline injection system to adjust the quantity of sorbent injected or the distribution of the particle sizes. If the sulfur content of the fuel is reduced (or increased), this input would be fed to the PLC controller 305, and in combination of knowing the current status of the other parameters noted above, the quantity and sizing of sorbent to be injected would be adjusted.

The flue gas sensors 310 may include a flow rate sensor to determine the rate the flue gas is flowing through the preheater 250, a particulate concentration sensor for measuring flue gas particulates, temperature sensors, and optionally sampling sensors to determine chemical properties of the flue gas particulates. PLC controller 305 reads information from these sensors to interactively calculate the proper mass flow rate of the alkaline particles 275 to be injected by alkaline injection system 276.

It would be desirable to change the particle size distribution of the sorbent being injected in order to optimize the location of the sorbent deposition on the heat transfer surface. The objective is to predict the location of the mass distribution of condensed acid on the heat transfer surface, and size the sorbent particles so their momentum would enhance the distribution of the sorbent material on the heat transfer surface in direct relation to the distribution location of the condensed acid. In this manner, the ratio of sorbent material of the proper sizing can be deposited on the heat transfer surface in the optimum location to react with the amount of condensed acid at a given location.

In addition to the above control logic, a pressure drop across the air preheater 250 would be continuously measured by sensors 301, 303 and compared to the calculated threshold (as defined in an algorithm installed in the PLC controller 305) as a function of the flue gas and air side flow rates and temperatures.

The predicted pressure drop vs. time relationship that would be desired to exist between sootblowing cycles of the heat transfer surface would also be an input to the PLC controller 305. If the actual pressure drop increased at a faster rate, it would be indicative of a buildup of flyash deposit and sulfuric acid on the heat transfer surface due to an inadequate mass quantity of sorbent injection, incorrect particle size distribution of the sorbent material, or improper operation of the alkaline injection system 276.

The PLC controller 305 would increase the sorbent injection rate in an attempt to return the pressure drop across the air heater vs. time relationship to the proper level. In addition, the sizing of the sorbent material would be altered by evaluating the various operating parameters used to control the system, and sending the proper signal to the pulverizing system to alter the sizing of the sorbent material as determined by the algorithm in the PLC controller 305. Note that the sorbent particle sizing process would not be applicable if the sorbent was injected via a slurry or solution.

Conversely, if the rate of pressure drop increase was below the predicted level based on actual operating conditions as calculated in PLC controller 305, the sorbent injection rate would be decreased to reduce operating costs.

During the sootblowing cycle, the flyash that has accumulated on the heat transfer surface since the last sootblowing cycle should be removed, and the resulting pressure drop across the air preheater would be reduced. However, if the deposit is too "wet" due to the presence of non-neutralized sulfuric acid, it will not be removed during the sootblowing cycle. Therefore, for a given flue gas flow rate and temperature, if the air preheater pressure drop vs. time relationship is greater than the standard profile that would be entered into the PLC controller 305, it would indicate that not enough sorbent is available in the flue gas, and/or the particle size distribution of the sorbent material is incorrect for the current operating conditions. A signal would be sent from the PLC controller 305 to the alkaline injection system 276 to increase the sorbent injection rate and/or alter the sorbent particle size distribution.

If the proper mass rate of alkaline particles 275 is being provided according to PLC controller 305, and the pressure drop exceed the calculated threshold, a larger relative ratio of large to small particles is provided as a sorbent 275. More of the large particles will come in contact with the heat transfer surfaces and neutralize and consume the acids holding particulates to the surfaces. If the sensed pressure drop is below the threshold, a smaller relative ratio of large to small alkaline particles is provided, allowing for more small particles to act as nucleation sites in the flue gases.

PLC controller 305 may optionally control a pulverizer 277 to direct the pulverizer to grind of alkaline particles 275 of a desired size or a distribution of sizes.

Other operating parameters that could be integrated into the PLC controller 305 to determine the sorbent injection rate are the voltage and amperage of the electric motor that is used to drive the rotor (512 of FIG. 1B) of the air preheater 250. As the mass of particulate deposits increase on the heat transfer surface of the air preheater, the overall weight of the rotor will increase. For a given voltage to the motor, this will cause the amperage draw by the motor to increase due to the additional friction in the rotor support bearing system as a result of the increased weight of the rotor on the bearing assembly. Therefore, the rotor drive motor voltage and amperage would be continuously measured and fed to the PLC controller 305 and included in the overall calculation to determine the mass injection rate and particle size distribution of the sorbent. The PLC control logic would include the target amperage to be maintained, and the range of acceptable amperage swing that could result from the normal accumulation of flyash on the heat transfer surface that would occur during the sootblowing cycles for the heat transfer surface. The PLC controller 305 would include the calculation methods to accommodate voltage swings that might occur, and therefore, adjust the target amperage level to be maintained as a function of the actual voltage levels if necessary.

As noted above, the introduction of alkaline particles into the flue gas stream FG1 greatly increases the effectiveness of the air preheater in capturing more heat from the flue gas stream FG1 and reduces the fouling of the heat transfer surface. This permits the gas outlet temperature of the flue gas leaving the air heater to be reduced. Practical design and cost limitations tend to determine the temperature at which the preheated air will leave the air preheater. However, the maximum gas outlet temperature reduction can be achieved while maintaining the desired air temperature leaving the air preheater by increasing the mass flow of air passing through the air preheater. In view of this, some provisions may be made to distribute excess heat in the form of additional heated air side mass flow to operations other than furnace operations.

In a further embodiment of the proposed invention (See FIG. 2B), an air preheater 250 is provided that is configured to distribute heat extracted from the flue gas FG1 to the furnace 26 via air stream A2 and to other purposes via auxiliary air stream(s) A3 and/or B2. Possible uses for these auxiliary air streams may include, for example, coal mill drying and grinding operations and/or preheating boiler feed water, site heating or cooling processes, preheating of the air entering the air preheater by direct recirculation of a portion of the heated air leaving the air heater to the inlet side of the air preheater so that it is mixed with the ambient air prior to increase the temperature of the air flow entering the air heater, indirect heating of the ambient air via the use of a heat exchanger wherein a portion of the hot air leaving the air heater is used to preheat the incoming ambient air prior to entry into the regenerative air preheater. There are additional uses such as off site uses district heating for industrial processes requiring a source of heated air, and thermal energy provided to $CO_2$ capture systems, including but not limited to, chilled ammonia or amine injection processes.

With reference to FIG. 2B, the EPRS 215 includes a regenerative air preheater 250, a particulate removal system 70 and a scrubber system 80. An FD fan 60 is provided to introduce an air stream A1 into the cold side of the air preheater 250 via inlet 251. As described above, the particulate removal system 70 may include an ESP and/or a fabric filter system, or the like. Scrubber system 80 may include a WFGD/DFGD system.

In this embodiment, an additional FD fan 260 is provided to introduce an auxiliary air stream B1 into the cold side of the air preheater 250 via inlet 256.

FIG. 3B is a diagram generally depicting further details an air preheater 250 configured to provide an alternate stream of heated air to certain predefined operations other than to the furnace combustion chamber.

Figure 3:
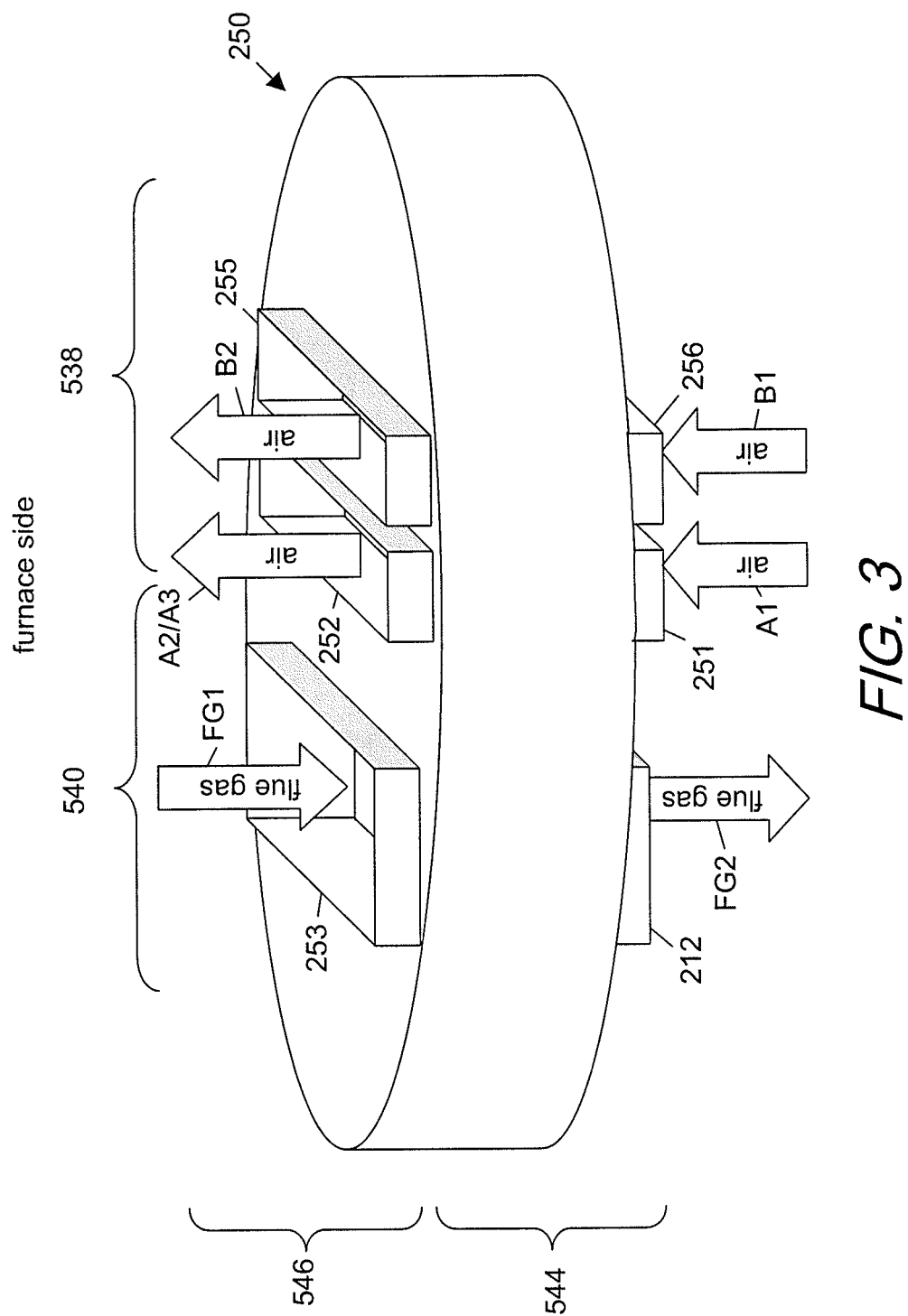
FIG. 3 is a schematic diagram depicting an embodiment of an air preheater having an auxiliary air inlet.

With reference to FIG. 3, air preheater 250 is configured to include an inlet 251 for receiving an air stream A1 and an auxiliary air inlet 256 for receiving an auxiliary air stream B1. An outlet 252 for outputting a heated air stream A2 to a furnace (26 of FIG. 2B). An auxiliary outlet 255 is also provided for outputting a second stream of heated air B2 to one or more predetermined operations or pieces of equipment such as a mill (270 of FIG. 2B). By having two separate outlets 252 and 255, heated air streams A2 and B2 may be separately controlled and heat extracted from the flue gas stream FG1 that is greater than is needed for proper operation of the furnace (26 of FIG. 2B). Heated air streams A3, B2 may be easily routed for use in other uses associated with the steam plant operations, or other plant related operations. Further, by providing two air inlets A1 and B1, it is possible to selectively or variably control air input to the air preheater. The principles and concepts disclosed and claimed herein are applicable to all air preheater devices/systems, including but not limited to bi-sector, tri-sector and quad-sector air preheater devices and systems.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed:

1. A method of extracting heat from a flue gas stream including acidic material and flue gas particulates using an air preheater equipped with a flue gas inlet, a flue gas outlet and a plurality of heat exchange surfaces, the method comprising:
    a. receiving a flue gas stream into the air preheater through the flue gas inlet of the air preheater;
    b. determining a mass flow rate of acid material entrained in the flue gas stream;
    c. determining a mass flow rate of alkaline particles to be injected into the flue gas stream to neutralize the entrained acidic material to obtain a determined mass flow rate;
    d. injecting at the determined mass flow rate alkaline particles with a bi-modal size distribution into the flue gas stream upstream of the air preheater for mixing of the alkaline particles with the flue gas stream before entering the air preheater;
    e. measuring a pressure drop across the air preheater from the flue gas inlet to the flue gas outlet;
    f. comparing the measured pressure drop to at least one predetermined threshold to obtain a determined degree of accumulation of flue gas particulates; and g. adjusting, based upon a mass rate of alkaline particles and the measured pressure drop, the bi-modal size distribution of the alkaline particles to be injected into the flue gas stream, to reduce accumulation of flue gas particulates on the heat exchange elements, to reduce fouling and corrosion of the air preheater, and to increase thermal efficiency of the air preheater.

2. The method of claim 1, wherein adjusting the bi-modal size distribution of the alkaline particles comprises:

a. increasing a percentage of large size alkaline particles as compared to small size alkaline particles when a pressure drop is higher than a predetermined threshold to increase alkaline particle contact and adherence, and neutralize acidic material condensation within the air preheater, and b. decreasing the percentage of large size alkaline particles as compared to small size alkaline particles when a pressure drop is lower than a predetermined threshold to decrease alkaline particle contact and adherence, and neutralize acidic material condensation, within the air preheater.

3. The method of claim 2, wherein the percentage of large size alkaline particles as compared to small size alkaline particles is achieved:

by controlling operation of a pulverizer to produce the bi-modal size distribution of the alkaline particles based on pressure drop as compared to the predetermined threshold.

4. The method of claim 1, wherein the air preheater is a rotary air preheater equipped with a rotor rotated by a motor powered by an electric current of a varying voltage, and wherein comparing the measured pressure drop to at least one predetermined threshold to obtain a determined degree of accumulation of flue gas particulates comprises:

a. measuring the voltage to obtain voltage measurement and measuring the electric current to obtain an electric current measurement;

b. comparing the electric current measurement at the voltage measurement to a predetermined electric current at a voltage the same as the voltage measurement to obtain a determined current difference; and c. determining a degree of accumulation of flue gas particles based on the determined current difference.

5. The method of claim 1, wherein the flue gas particulates include fly ash.

6. The method of claim 1, wherein based upon the determined degree of accumulation of flue gas particulates in the air preheater, the mass flow rate at which the alkaline particles are injected into the flue gases is determined.

7. The method of claim 1, wherein the entrained acidic material is an acidic material that is capable of being neutralized by alkaline particles.

* * * * *